United States Patent
Shimao et al.

(10) Patent No.: US 8,485,811 B2
(45) Date of Patent: Jul. 16, 2013

(54) FINE STRUCTURE FORMATION APPARATUS

(75) Inventors: Daisuke Shimao, Tainai (JP); Takanori Yamasaki, Chigasaki (JP); Mitsuru Hasegawa, Hitachi (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 108 days.

(21) Appl. No.: 12/824,957

(22) Filed: Jun. 28, 2010

(65) Prior Publication Data

US 2011/0109011 A1    May 12, 2011

(30) Foreign Application Priority Data

Nov. 9, 2009   (JP) ................................. 2009-255685

(51) Int. Cl.
*B29C 59/04*      (2006.01)

(52) U.S. Cl.
USPC ........... 425/335; 425/385; 425/363; 425/371; 425/384

(58) Field of Classification Search
USPC .......................... 425/385, 335, 363, 371, 384
See application file for complete search history.

(56) References Cited

U.S. PATENT DOCUMENTS

| | | | |
|---|---|---|---|
| 3,228,062 A * | 1/1966 | Claus .............................. | 425/79 |
| 3,736,081 A * | 5/1973 | Yovanovich .................. | 425/4 C |
| 3,761,209 A * | 9/1973 | Hanton ......................... | 425/4 C |
| 4,230,649 A * | 10/1980 | Bohm et al. .................. | 264/470 |
| 4,283,246 A * | 8/1981 | Held .............................. | 156/555 |
| 4,285,654 A * | 8/1981 | Bohm et al. .................. | 426/327 |
| 4,541,889 A * | 9/1985 | Held ............................. | 156/583.5 |
| 4,601,861 A * | 7/1986 | Pricone et al. ................ | 264/1.6 |
| 4,778,373 A * | 10/1988 | Held ............................. | 425/335 |
| 5,352,321 A * | 10/1994 | Held ............................. | 156/498 |
| 6,756,002 B2 * | 6/2004 | Fujii et al. .................... | 264/210.2 |
| 6,908,295 B2 * | 6/2005 | Thielman et al. ............. | 425/371 |
| 7,419,373 B2 * | 9/2008 | Gerhard et al. ............. | 425/174.6 |
| 8,083,515 B2 * | 12/2011 | Ogino et al. .................. | 425/471 |
| 2003/0107147 A1 * | 6/2003 | Thielman et al. ............. | 264/104 |
| 2004/0265553 A1 * | 12/2004 | Rockwell et al. ............. | 428/218 |
| 2005/0212173 A1 * | 9/2005 | Swanson ....................... | 264/280 |
| 2009/0166914 A1 * | 7/2009 | Ogino et al. .................. | 264/175 |

FOREIGN PATENT DOCUMENTS

| | | |
|---|---|---|
| JP | 2003-291211 | 10/2003 |
| JP | 2006-326948 | 12/2006 |
| JP | 2008-155413 | 7/2008 |
| JP | 2009-158731 | 7/2009 |

* cited by examiner

*Primary Examiner* — Christina Johnson
*Assistant Examiner* — Saeed Huda
(74) *Attorney, Agent, or Firm* — McDermott Will & Emery LLP

(57) ABSTRACT

A fine structure formation apparatus includes a preheating heater to heat up the surface of belt-like mold alone, right before contacting the belt-like mold to heating and pressurizing rollers, the temperature of the surface of the belt-like mold is made equal to that of the heating and pressurizing rollers, enabling to reliably obtain a predetermined temperature, and cooling rollers or a cooling blower are arranged right after the heating and pressurizing rollers, enabling cooling by a forced cooling and pressure holding, and to transfer a pattern.

19 Claims, 8 Drawing Sheets

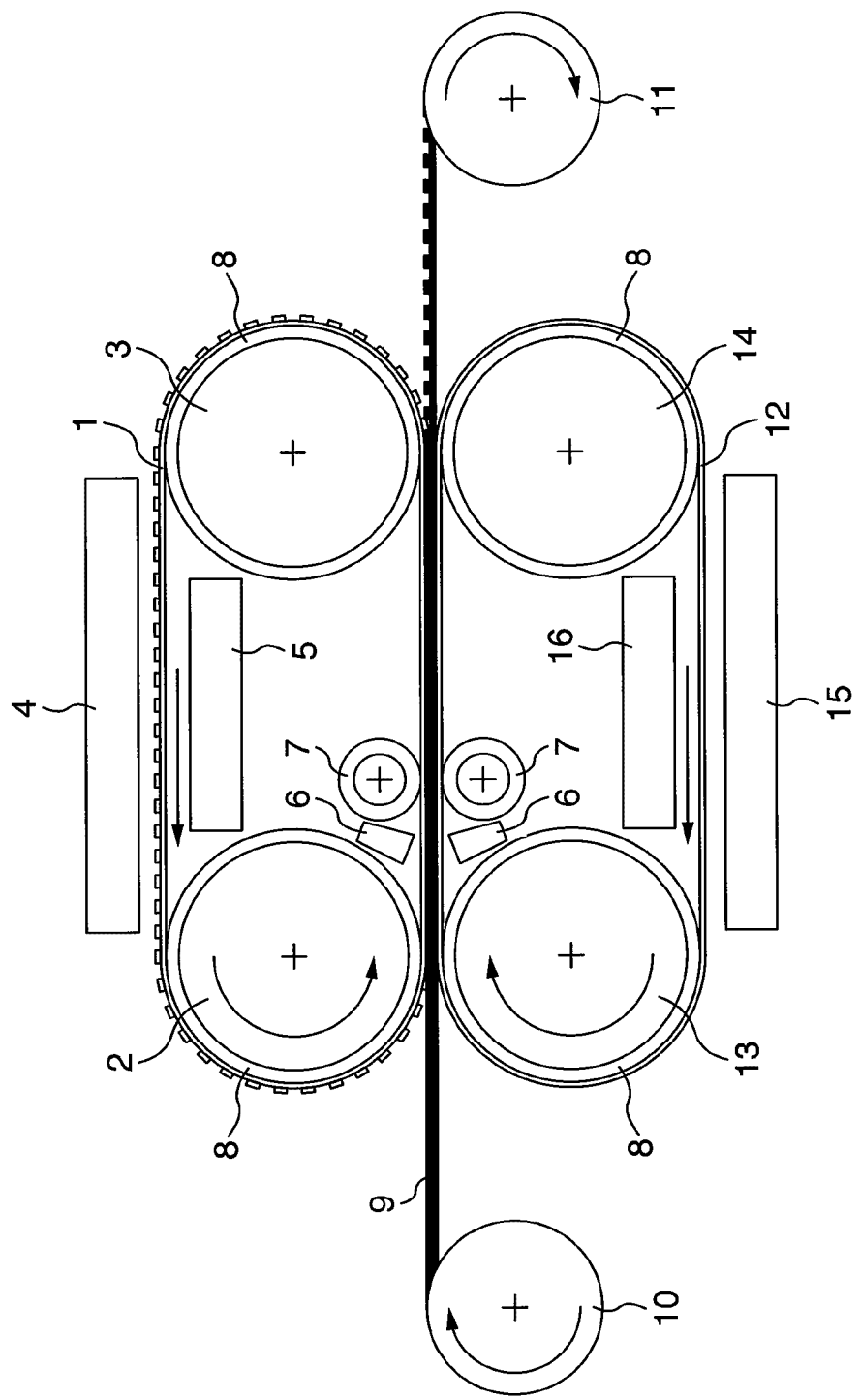

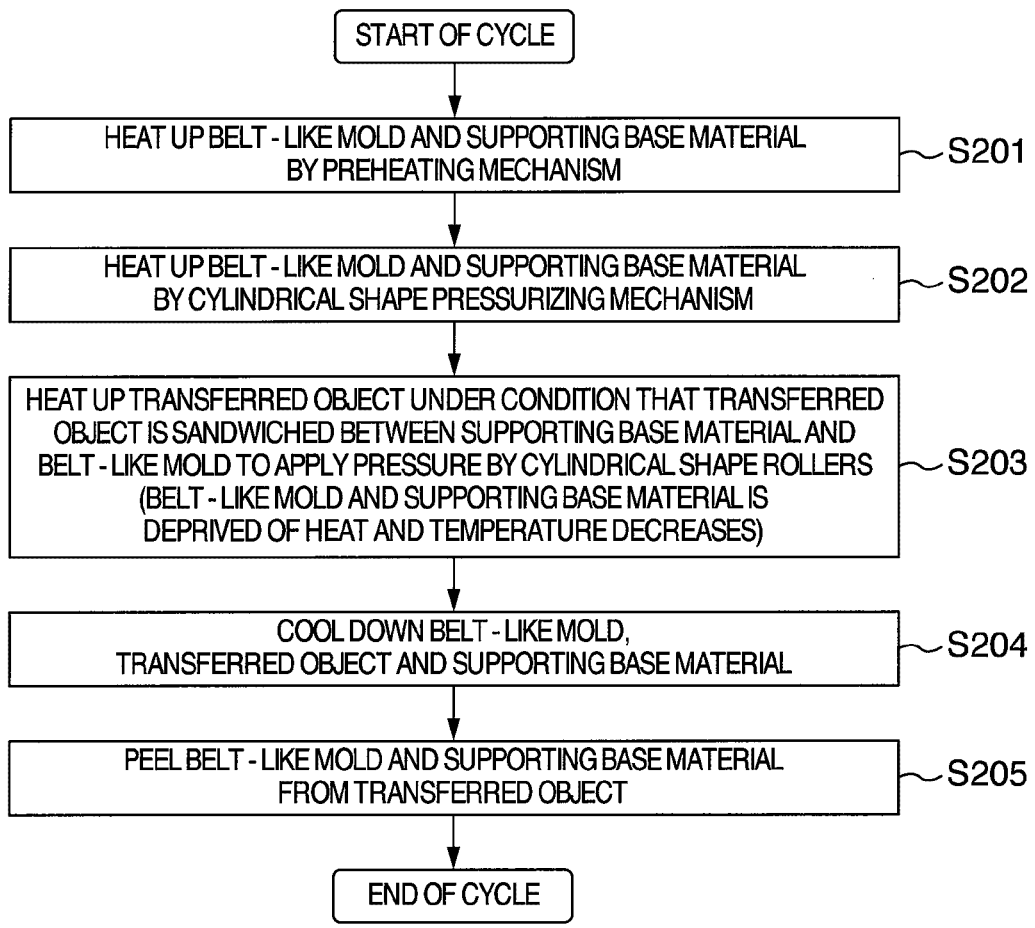

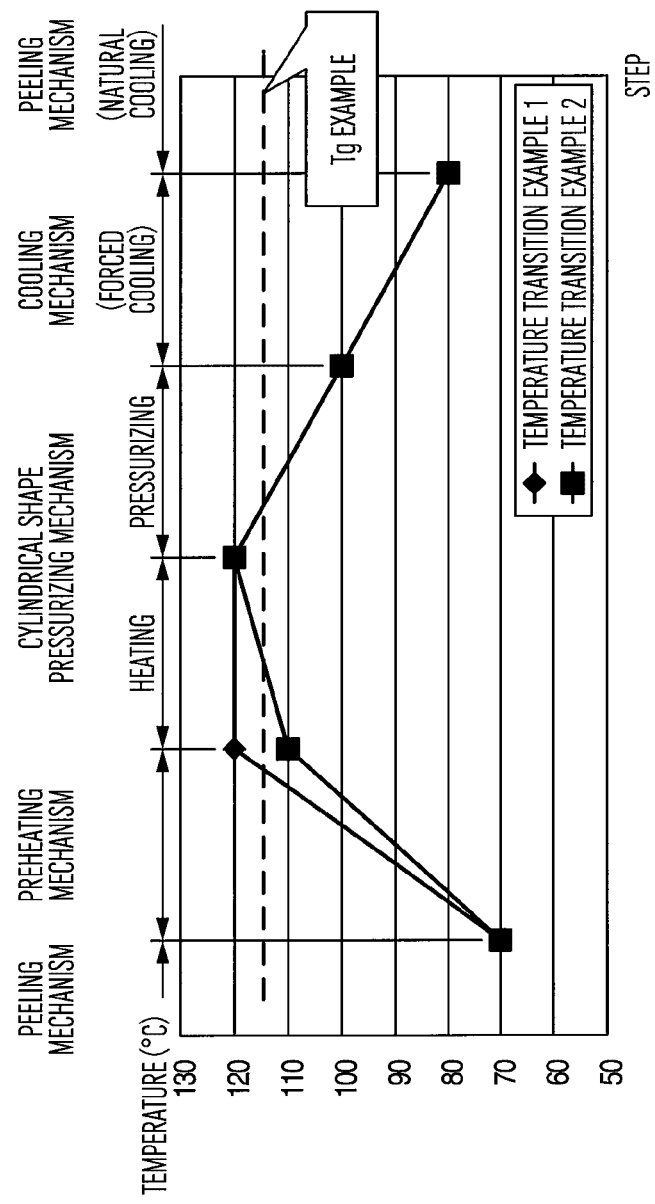

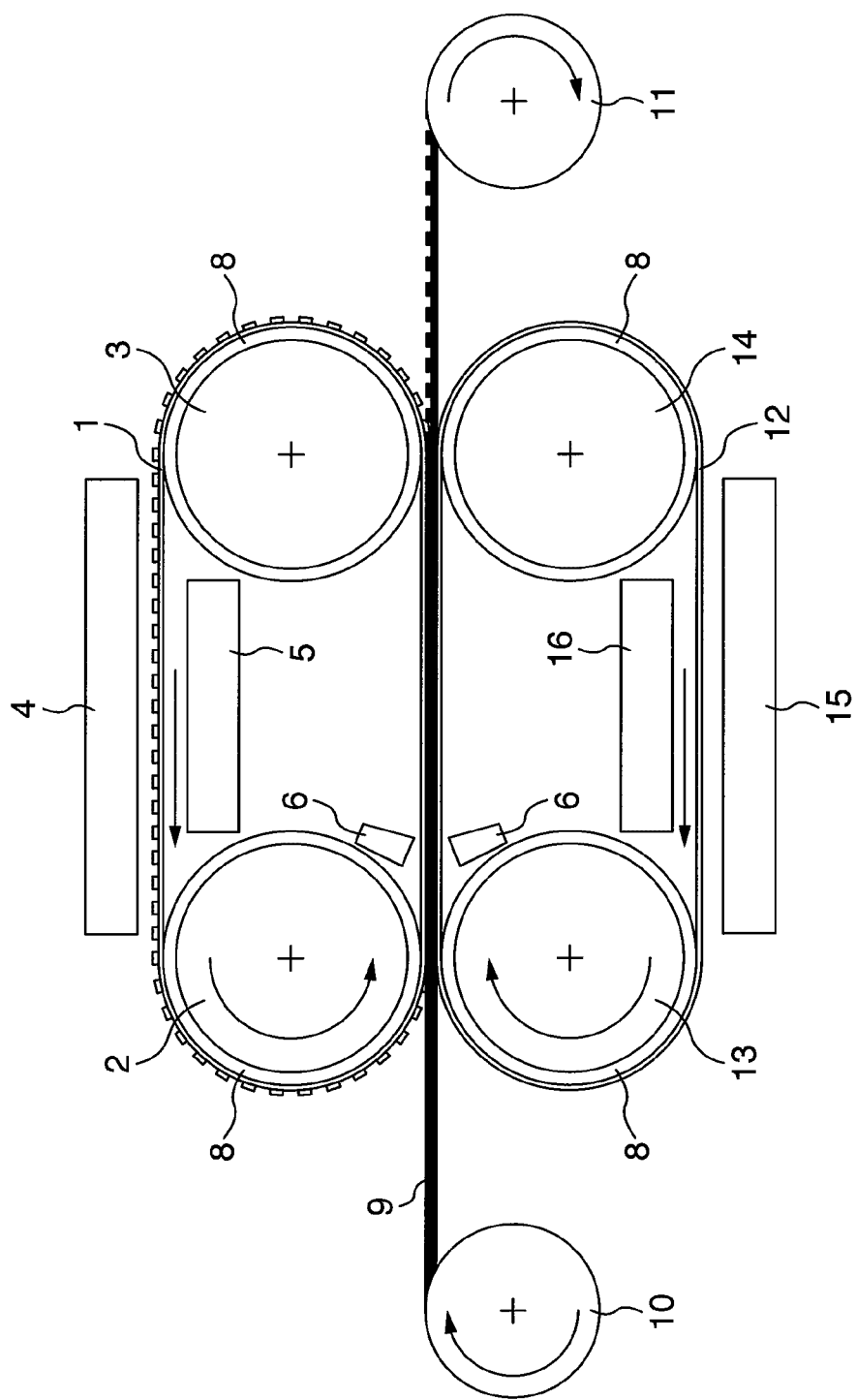

FINE STRUCTURE FORMATION APPARATUS

INCORPORATION BY REFERENCE

The present application claims priority from Japanese application JP2009-255685 filed on Nov. 9, 2009, the content of which is hereby incorporated by reference into this application.

BACKGROUND OF THE INVENTION

The present invention relates to a fine structure formation apparatus to form a fine structure to be pressed onto a transferred object, by using a stamper forming fine recess/projections having a unit of nanometer or micrometer.

Recently, semiconductor integrated circuits have been developed their fining and integration. For a purpose of realizing such a fining, photolithography devices have been made highly accurate as a pattern transfer technique. However, the wavelength used in the fabrication method has been close to the wavelength of light source used for an exposure, therefore, the lithography technique has also been close to the limit of usage. To this end, for a purpose of advancing further the fining and higher accuracy, electron beam lithography devices have been used as a charged corpuscular particle beam device, instead of the lithography technique.

The pattern formation by using the electron beam is performed by drawing mask patterns as different from a batch exposure by using a light source of i rays, excimer lasers, etc. Therefore, the more the number of patterns to be drawn, the more the exposure (lithography) time is required. In consequence, the above-mentioned method has a drawback such that it takes a lot of time to form the patterns. As the integration degree of the circuit is dramatically increased to 256 megabyte, 1 gigabyte and 4 gigabyte, the time of forming the patterns is also increased, and there is concerned that the throughput is considerably deteriorated. Consequently, for a purpose of achieving a high speed electron beam lithography device, a batch graphic projection method has been developed, that is, various shapes of masks are combined and the electron beam is irradiated collectively on a combination of the masks thereby to form a complex shaped electron beam. In consequence, although a pattern fining has been continued, it is compulsive that the electron beam lithography device becomes large and it is required to provide a mechanism for controlling mask positions in high accuracy. Thus, there is a drawback that the device cost is increased. In contrast, JP-A-2003-291211, JP-A-2006-326948, JP-A-2008-155413 and JP-A-2009-158731 disclose a technique to perform the fine pattern formation in low cost and high throughput. According to this technique, a mold having a recess/projection pattern identical to a pattern to be formed on a transferred object is pressed onto a resist film layer formed on the surface of the transferred object or on the transferred object itself to thereby transfer the predetermined pattern.

The JP-A-2003-291211 discloses that an endless-belt shaped stamper is pressed onto a resist layer formed on a substrate surface by a heater built-in roller to continuously transfer the pattern.

The JP-A-2006-326948 discloses a technique in which multiple-stage heating rollers and heating layers are used to enable high speed transfer.

The JP-A-2008-155413 and JP-A-2009-158731 also disclose a technique to inhibit an occurrence of transfer defective such as wrinkle-like dents occurred in the JP-A-2003-291211 and JP-A-2006-326948.

SUMMARY OF THE INVENTION

In the fine structure formation system of the JP-A-2003-291211, the system uses a linear (one-dimensional) pressurization applied by rotating rollers provided with a heater used for heating up the resist layer, therefore, the transfer to a large area is relatively easy. However, the roller for performing the heating and pressurizing is configured by a single stage, so that a sufficient thermal softening transfer sometimes cannot be performed when the pattern aspect ratio is high. Particularly, when a columnar structure is intended to be formed by an opening structure on the stamper side, it is required that a roller rotation speed is made slow so that the resist layer may soften to go sufficiently into the opening of the stamper. In consequence, the tact time increases and the productivity is lowered.

In the JP-A-2006-326948, a transferred object and a belt-like mold are heated up in several stages. This situation indicates that the transferred object is sandwiched between the belt-like molds alone, that is, the structure is such that the heat is applied to the transferred object under a condition that the pressure is released. Consequently, the transferred object, particularly thin film resin, is expanded widely since the pressure is not applied, and as a result, the wrinkle-like dent occurs by this adverse effect to cause the transfer defective.

In the JP-A-2008-155413 and JP-A-2009-158731, there is disclosed a structure in which the transferred object is not contacted to the belt-like mold until right before applying the pressure and heat so that the occurrence of the wrinkle-like dent can be inhibited, while the belt-like mold is heated up in response to the heat conduction only when it is contacted to heating rollers. The surface temperature of the belt-like mold can be calculated by a relational expression obtained from heat conductivity, the temperature of the heating rollers, contacting time, amount of heat dissipation, etc. In this case, it takes a lot of time to rise up to a predetermined temperature, so that the productivity in high throughput cannot be obtained. (In an actual measurement, assuming that the surface temperature on the heating rollers having a 150 mm diameter is set at 180° C., it takes about 35 seconds to rise the mold surface temperature from 80° C. to 180° C. when heating up under a condition that the belt-like mold is contacted to a half around of the heating roller. In this case, the molding speed is about 600 mm/min. Here, the above-mentioned example is not definite since the heat conductivity varies large depending on the sheet thickness of the belt-like mold and the mold structure. In a practical example, a nickel replica mold having a 0.01 mm thickness is bonded to a SUS belt having a 0.2 mm sheet thickness by applying a bond with a 0.01 mm thick to the SUS belt.)

Here, in the JP-A-2008-155413 and JP-A-2009-158731, the above-mentioned problem might be solved, as means which rises the surface temperature of the belt-like mold up to the predetermined temperature, by uses of a material having a high thermal conductivity for the belt-like mold or of the heating and pressurizing rollers having a large diameter, or of a high temperature on the roller surfaces. However, the temperature rise is limited to 200° C. to 300° C. since an elastic body, mainly resin, is used for the heating and pressurizing rollers to take a time of pressurizing the belt-like mold, so that the decrease of the tact time can be expected to be a little amount. Furthermore, if the diameter of the roller is further increased for taking the time of heating, it will result in that the device becomes huge and the cost of the device and the belt-like mold increase.

Moreover, although in all of the above-mentioned documents, natural or forced cooling is applied to the heating and pressurizing rollers after the heating and pressurizing operations. Even under this condition, when the belt-like mold is kept at high temperature and the transferred object is sandwiched between the belt-like molds, at the moment the pressure between the belt-like molds is released, a heat deformation occurs in the transferred object to cause the transfer defective. For this reason, both the forced heating and cooling operations are required for obtaining the high throughput.

An object of this invention is to provide a fine structure formation apparatus in which the apparatus size is made small, the surface temperature on the belt-like mold is kept reliably at a predetermined temperature even though the rotating speed of the roller is increased to upgrade the productivity, and thereby patterns can be transferred as expected.

In order to achieve the object, according to an aspect of the invention, the fine structure formation apparatus is provided with a preheating heater to heat up the surface of the belt-like mold alone right before contacting the belt-like mold to the heating and pressurizing rollers, and the temperature of the surface of the belt-like mold is made equal to that of the heating and pressurizing rollers so that a predetermined temperature can be secured. Furthermore, cooling rollers or a cooling blower are attached right after the rear portion of the heating and pressurizing rollers to enable the forced cooling and pressure holding, and thus transferring patterns.

According to another aspect of the invention, the fine structure formation apparatus provides a mold structure of an entire circumference of the belt-like mold or a mold structure of a part of the circumference, and a supporting base material is a belt-like shape.

According to still another aspect of the invention, in the fine structure formation apparatus, the material of the supporting base material and that of the belt-like mold are the same, and the supporting base material is made of a metal.

According to still another aspect of the invention, in the fine structure formation apparatus, the supporting base material is of a material having flexibility.

According to still another aspect of the invention, in the fine structure formation apparatus, a transferred object is a belt-like film having a thickness equal to or less than 100 μm, and an elastic body is formed on the surface of a cylindrical shape pressurizing mechanism.

According to still another aspect of the invention, the fine structure formation apparatus provides a peeling mechanism to peel the belt-like mold and the supporting base material from the transferred object; the belt-like mold, transferred object and the supporting base material travel from the cylindrical shape pressurizing mechanism to the peeling mechanism under a condition that they are contacted to each other; and the belt-like mold and the supporting base material are peeled from the transferred object by the peeling mechanism.

According to still another aspect of the invention, the preheating mechanism of the fine structure formation apparatus uses a radiation heat from a lamp heater etc. enabling a rapid heat up, and also uses a non-contact high-frequency induction heating enabling the rapid heat up, and further uses a heating roller contacted to a rear surface of the belt-like mold also enabling the rapid heat up.

According to the invention, the fine structure formation apparatus and fine structure formation method can be provided, enabling to achieve a high throughput, to make the apparatus small, and to inhibit the occurrence of the transfer defective such as wrinkle-like dents during before and after the heating and pressurizing operations.

The other objects, features and advantages of the invention will become apparent from the following description of the embodiments of the invention taken in conjunction with the accompanying drawings.

BRIEF DESCRIPTION OF THE DRAWINGS

FIG. 1 is a schematic diagram of a fine structure formation apparatus having a heating and cooling mechanism according to an embodiment of the invention;

FIG. 2A is a flowchart representing a heating and cooling operation;

FIG. 2B is a diagram representing a temperature transition in the heating and cooling operation;

FIG. 5 is a schematic diagram of another fine structure formation apparatus without having cooling rollers.

DETAILED DESCRIPTION OF THE EMBODIMENTS

Figure 3:
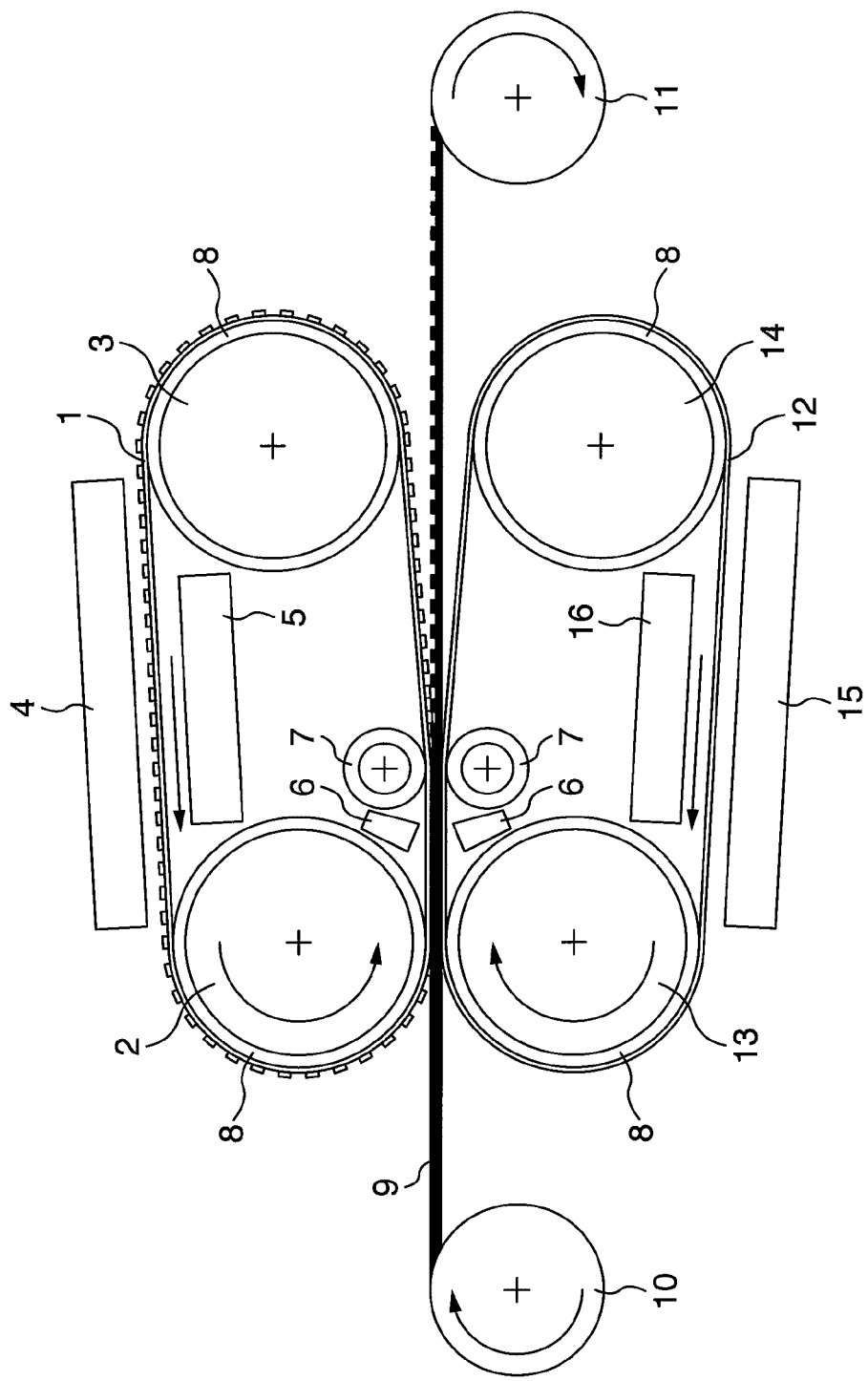
FIG. 3 is a schematic diagram of a peeling operation to peel a belt-like mold and a supporting base material from a transferred object in the fine structure formation apparatus.

First, the fine structure formation apparatus and the transfer method will be described below.

FIG. 1 is a schematic diagram of the fine structure formation apparatus according to an embodiment of the invention.

The fine structure formation apparatus provides a cylindrical shape pressurizing mechanism including a belt-like mold 1 forming a fine structure thereon and a pair of opposed cylindrical shape rollers (a cylindrical shape pressurizing mechanism upper roller 2, a cylindrical shape pressurizing mechanism lower roller 13) for heating and pressurizing the belt-like mold 1 against a surface of a transferred object 9 sandwiched with a supporting base material 12 fitted on the cylindrical shape rollers. The belt-like mold 1 is attached to allow traveling on an apparatus body via the cylindrical shape pressurizing mechanism upper roller 2, a peeling mechanism upper roller 3 and a cooling roller 7.

The supporting base material 12 is also attached to allow traveling on the apparatus body via the cylindrical shape pressurizing mechanism lower roller 13, a peeling mechanism lower roller 14 and the cooling roller 7. Here, when the belt-like mold 1 travels from the peeling mechanism upper roller 3 to the side of cylindrical shape pressurizing mechanism upper roller 2, the belt-like mold 1 is heated up to a predetermined temperature by an upper preheating mechanism (a belt-like mold surface preheating mechanism 4, and a belt-like mold rear surface preheating mechanism 5) until right before the belt-like mold 1 is contacted to the cylindrical shape pressurizing mechanism upper roller 2. Similarly, when the supporting base material 12 travels from the peeling mechanism lower roller 14 to the cylindrical shape pressurizing mechanism lower roller 13, the supporting base material 12 is heated up by a lower preheating mechanism (a supporting base surface preheating mechanism 15 and a supporting base rear surface preheating mechanism 16) until right before the supporting base material 12 is contacted to the cylindrical shape pressurizing mechanism lower roller 13. At the time of heating up, the predetermined temperatures for the belt-like mold 1 and supporting base material 12 can be set individually. Thereafter, the belt-like mold 1 and supporting base material 12 are uniformly heated up to the predetermined temperature. Next, the belt-like mold 1, transferred object 9 and the supporting base material 12 are ejected in this order being contacted by an applied pressure, and then enter a cooling mechanism (a cooling blower 6 and a cooling roller 7). At this time, the temperature of the transferred object 9 becomes equal to or lower than a Tg (glass-transition temperature) under a condition that the belt-like mold 1, the transferred object 9 and the supporting base material 12 are kept to receive a holding pressure. The transferred object 9 is supplied to the cylindrical shape pressurizing mechanism from a wind-off roller 10 to roll up by a base-material roll-up roller 11. The fine structure formation apparatus in this embodiment has a feature that the belt-like mold 1, the transferred object 9 and the supporting base material 12 travel to the cylindrical shape pressurizing mechanism without contacting each other, and the transferred object 9 disposed between the belt-like mold 1 and the supporting base material 12 is pressurized by the cylindrical shape pressurizing mechanism.

FIG. 2A is a flowchart representing a process of applying the heat and cooling. FIG. 2B is a diagram representing a temperature transition. The following description will be concerned with the process of applying heat and cooling to the belt-like mold 1 and the supporting base material 12 with reference to FIGS. 2A and 2B.

First, the belt-like mold 1 is heated up when the belt-like mold 1 travels toward the cylindrical shape pressurizing mechanism upper roller 2 from the peeling mechanism upper roller 3, and then enters the upper preheating mechanism (the belt-like mold surface preheating mechanism 4 and the belt-like mold rear surface preheating mechanism 5), (step S201). A temperature rising speed is obtained from an energy amount and a temperature rising time, that is, obtained from a power to the preheating heater and a feed speed of the belt-like mold 1, to be a proportional relation. At this time, it is desirable that the temperature becomes around the Tg as indicated in FIG. 2B so that this temperature becomes an aid to rise up to the predetermined temperature.

Next, the belt-like mold 1 is contacted to the cylindrical shape pressurizing mechanism upper roller 2 to be heated up via an elastic body 8, at a step S202. At this time, the temperature rising speed is dependent on the temperature of the cylindrical shape pressurizing mechanism upper roller 2 and its contact time. A pressure is then applied to transfer the fine structure on the belt-like mold 1 to the transferred object 9 under a condition that the transferred object 9 is sandwiched between the belt-like mold 1 and supporting base material 12. The transferred object 9 is heated up, under a condition that the pressure is applied by a pressurizing member, to make the transferred object 9 soften and transfer the fine structure on the belt-like mold 1 to the transferred object 9, (step S203). Here, it is not desirable that the heat is applied under a condition that the belt-like mold 1, the supporting base material 12 and the transferred object 9 are contacted with each other before applying the pressure, since wrinkle-like dents are easy to occur at a time of the transfer. Next, after the fine structure on the belt-like mold 1 is transferred to the transferred object 9 at the steps S202, S203, the belt-like mold 1, the transferred object 9 and the supporting base material 12 are cooled down to a predetermined temperature, (step S204). Thereafter, the belt-like mold 1 and supporting base material 12 are peeled off from the transferred object 9, (step S205). Here, it is desirable that a heat-retention mechanism is added to the peeling mechanism since the belt-like mold 1 is deprived of the heat by an ambient air to decrease the temperature in natural until the belt-like mold 1 comes out from the cooling mechanism and the peeling mechanism. The supporting base material 12 is also heated up similarly to the belt-like mold 1 described above.

Here, although the elastic body 8 is provided on the cylindrical shape pressurizing mechanism upper roller 2 so that the pressure is applied thereto for a predetermined time, other than the heating, the temperature can be raised not so high since the allowable temperature of the elastic body 8 has an upper limit. Therefore, there is no other way than the size of the cylindrical shape pressurizing mechanism upper roller 2 is made large or the rotating speed thereof is decreased so that the contacting time with the cylindrical shape pressurizing mechanism upper roller 2 is increased. To this end, it is the best way that heat energy is given to the cylindrical shape pressurizing mechanism upper roller 2 by the above-mentioned preheating mechanism to preheat it up to the predetermined temperature so that both the high throughput and downsizing are realized simultaneously.

It is desirable that the preheating heater is a roller type so that a mechanical damage is not given to the belt-like mold 1 in the case of a contacting type, however, the contacting time is short and the given heat amount is also little. Consequently, non-contact heating is preferred. Particularly, it is desirable to use a radiation heat for the preheating. Although it is possible to use a method of heating by electromagnetic induction, configuration of an induction coil becomes complicated and a control device becomes also large since the belt-like mold 1 is a wide and thin plate to be heated up uniformly. Further, there is also a method of heating by a hot blast, but this is unsuitable for a clean environment. Here, it is desirable, when performing the heating, preheating and heat-retention, that the apparatus is surrounded in room-like so that the heat may not leaked to outside. The heater may also be incorporated in the peeling mechanism lower roller 14 and peeling mechanism upper roller 3 so as to keep the heat therein in order to prevent that the belt-like mold 1 and the supporting base material 12 from decreasing the temperature after traveling the cooling mechanism.

In this invention, the fine structure means a structure body having recess/projection structures in a range of about several μm to several nm.

Further, in this invention, the belt-like mold 1 is a belt shape on which the fine structure is formed and rotatable being wrapped around the plurality of rollers. It is desirable that the belt-like mold 1 has a predetermined strength and flexibility capable of traveling smoothly being contacted and wrapped on the surfaces of the rollers. Although the material of the belt-like mold 1 is not particularly restricted, but it is desirable to use, for example, a Ni foil, a polyimide film, from the viewpoint of the strength and flexibility. Further, the mold member may be an endless stainless belt or a resin belt on which the fine structure is bonded via a bond.

Although the cylindrical shape rollers 2, 3, 13, 14 and cooling rollers 7 according to the invention rotate with the travelable belt-like mold 1, the rollers themselves may have a drive mechanism to travel the belt-like mold 1. It is more desirable that the cooling roller 7 and peeling roller 3 have a tension adjustment mechanism for adjusting the tension of the belt-like mold 1. This is also similarly applied to the cooling roller 7 and peeling roller 14 for supporting the supporting base material 12.

The cylindrical shape pressurizing mechanism according to the invention is configured by the pair of cylindrical shape rollers 2, 13 which are opposed with each other. These cylindrical shape rollers 2, 13 are a column-shaped casting piece or a cylindrically molded piece having a predetermined strength and rotatable about their central axis. The material thereof is not particularly restricted, but it is more desirable to use an alloy such as stainless steel, ceramics, engineering plastics, etc. from the viewpoint of the strength, moldability, etc. The cylindrical shape pressurizing mechanism configures such that the transferred object 9 is sandwiched between the belt-like mold 1 and the supporting base material 12 to be heated up and pressurized, and the belt-like mold 1, the supporting base material 12 and the transferred object 9 are driven to travel. A thrust force for pressing is realized by applying a force by pneumatic pressure, hydraulic pressure, etc. to both ends of the rotating axis of the cylindrical shape roller. The thrust force is adjusted by adjusting the pressure applied to the transferred object 9, the belt-like mold 1 and the supporting base material 12 by the cylindrical shape rollers. It is desirable to have a uniform pressurizing adjustment mechanism for independently adjusting the pressure at the both ends of the rotating axis so that the entire rollers uniformly pressurize the belt-like mold 1, the transferred object 9 and the supporting base material 12. The cylindrical shape pressuring mechanism incorporates a heating mechanism including a heating wire, an inductive heater, an infrared heater, etc., for heating up the belt-like mold 1 and the transferred object 9. The cylindrical shape pressurizing mechanism also has a drive mechanism for the travel of the belt-like mold 1, the transferred object 9 and the supporting base material 12.

Further, it is desirable that the elastic body 8 is formed on the surface of the cylindrical shape rollers 2, 13 used in the cylindrical shape pressurizing mechanism according to the invention, for applying the pressure uniformly to the belt-like mold 1, transferred object 9 and supporting base material 12. The elastic body 8 formed on the surface of the cylindrical shape rollers is of a fluorine-contained rubber, silicone rubber, fluoride silicon rubber, acrylic rubber, hydrogenated nitrile rubber, ethylene-propylene rubber, chlorosulphonated polyethylene rubber, epichlorohydrin rubber, butyl rubber, polyurethane rubber, etc. The elastic body 8 is also of polyimide (PI), polycarbonate (PC)/acrylonitrile butadiene styrene (ABS) alloy, polysiloxane dimethylene terephthalate (PCT)/polyethylene terephthalate (PET) copolymerized polybutylen phthalate (PBT)/polycarbonate (PC) alloy, polytetrafluoroethylene (PTFE), fluorinated ethylene propylene (FEP), polyarylate, polyamide (PA)/acrylonitrile butadiene styrene (ABS) alloy, denaturalization epoxy, denaturalization polyolefin, etc. The elastic body 8 may be further of various thermohardening resins including an epoxy resin, unsaturated polyester resin, epoxy isocyanate resin, maleimide resin, maleimide epoxy resin, cyanic acid ester resin, cyanic acid ester epoxy resin, cyanic acid ester maleimide resin, phenol resin, diallyl phthalate resin, urethane resin, cyanamide resin, maleimide cyanamide resin, etc., and a material mixed with two or more of these thermohardening resins. The physical property of the elastic body 8 preferably has a heat resistance in a range from 200° C. to 300° C., and the coefficient of elasticity ranged from about 100 MPa to 4000 MPa. Further, a high-pressure fluid layer may be formed on the outer circumference portion of the cylindrical shape pressurizing mechanism, instead of forming the elastic body 8. To this end, a coated membrane for encapsulating the high-pressure fluid may be formed on top surface of the rollers of the cylindrical shape pressurizing mechanism. The material of the coated membrane according to the invention is not particularly restricted if it has a sufficient heat resistance, pressure resistance and flexibility. Specifically, the coated membrane includes a metallic foil such as stainless steel and also includes a composite material such as a rubber sheet reinforced by engineering plastics such as polyimide film, wires and fibers. Further, it is desirable that the high-pressure fluid has such a property that the pressure applied to the rollers is given uniformly as a gravitational pressure to the entire contacted portion of the belt-like dire 1 and supporting base material 12, and specifically, it includes a gas such as air, nitrogen, etc., and also includes liquid such as silicon oil and a gel-like material such as polydimethylsiloxane etc. It is also desirable that the pressure of the high-pressure fluid layer is adjustable.

The material of the transferred object 9 on which the fine structure is transferred is not particularly restricted, but it is selectable in accordance with a desired purpose. Specifically, the material of that is of a thermoplastic resin including polyethylene, polypropylene, polyvinyl alcohol, polyvinylidene chloride, polyethylene terephthalate, polyvinyl chloride, polystyrene, ABS resin, AS resin, acrylic resin, polyamide, polyacetal, polybutylene terephthalate, glass reinforced polyethylene terephthalate, polycarbonate, denaturalized polyphenylene ether, polyphenylene sulfide, polyether ether ketone, liquid crystallinity polymer, fluorine-contained resin, polyarete, polysulphone, polyether sulfone, polyamide imide, polyether imide, thermoplastic polyimide, etc., and a thermohardening resin including phenol resin, melamine resin, urea resin, epoxy resin, unsaturated polyester resin, alkyd resin, silicon resin, diallyl phthalate resin, polyamide bismaleimide, polyamide triazole, etc, and also a material mixed with two or more of the above materials can be used.

The above-mentioned resin is supplied with a film-like product as an elemental substance, and sometimes formed in a thickness of range of several nm to several ten μm on the surface of a supporting substrate. Here, the supporting substrate is a substrate for supporting a member on which a pattern is formed. Although the material of the supporting substrate is not particularly restricted, a member which has a predetermined strength and a flat surface on which the fine structure is formed can be used. More preferably, it is also desirable that the supporting substrate has flexibility capable of being fed continuously and wrapped around on the rolls so that the pattern is formed continuously. Specifically, it is desirable that the supporting substrate is of various metallic materials such as stainless steel, plastics such as a polyimide film, for example.

It is still desirable that the supporting base material 12 is a material having a similar coefficient of elasticity and a linear coefficient of expansion to the belt-like mold 1, for realizing an advantage of the invention. It is also desirable that the shape of supporting base material 12 is a belt-like type for transferring the pattern continuously. Further, it is still desirable that the supporting base material 12 is a flat belt-like type to wrap around the rollers and to be able to travel, has a predetermined strength, and also has flexibility capable of traveling in a contacted manner on the rollers wrapped around. Although the material of the supporting base material 12 is not particularly restricted, but it is desirable to use a metal such as an Ni foil, a stainless steel plate, etc. and a polyimide film, from the viewpoint of the strength and flexibility.

The peeling mechanism in the invention is used for peeling the belt-like mold 1 and the supporting substrate from the transferred object 9, from the situation that the belt-like mold 1, the transferred object 9 and the supporting base material 12 are contacted with each other. Specifically, the peeling mechanism is not particularly restricted to this configuration, as long as it plays a roll of changing travel directions of the belt-like mold 1 and the supporting base material 12 by rotating about the axes of a pair of cylindrical shape rollers. Specifically, the peeling mechanism is configured by the rollers made of a column-shaped casting piece or cylindrical-shaped molding piece having a predetermined strength and capable of rotating about their center axes. The material thereof is not particularly restricted, but it is desirable to use an alloy such as stainless steel, ceramics, engineering plastics, from the viewpoint of the strength and moldability. Further, the elastic body may be formed on the surface of rollers.

It is also desirable that the cylindrical shape roller itself has an own drive mechanism. As illustrated in FIG. 3, it is also desirable that a gap between the peeling mechanism upper roller 3 and the peeling mechanism lower roller 14 is adjusted to be able to obtain a suitable peeling angle.

The wind-off roller 10 and the base material roll-up roller 11 have respectively a brake and a drive mechanism so that a predetermined tensile force is given to the transferred object 9 when the belt-like transferred object 9 is supplied and taken up before and after the transfer.

Figure 6:
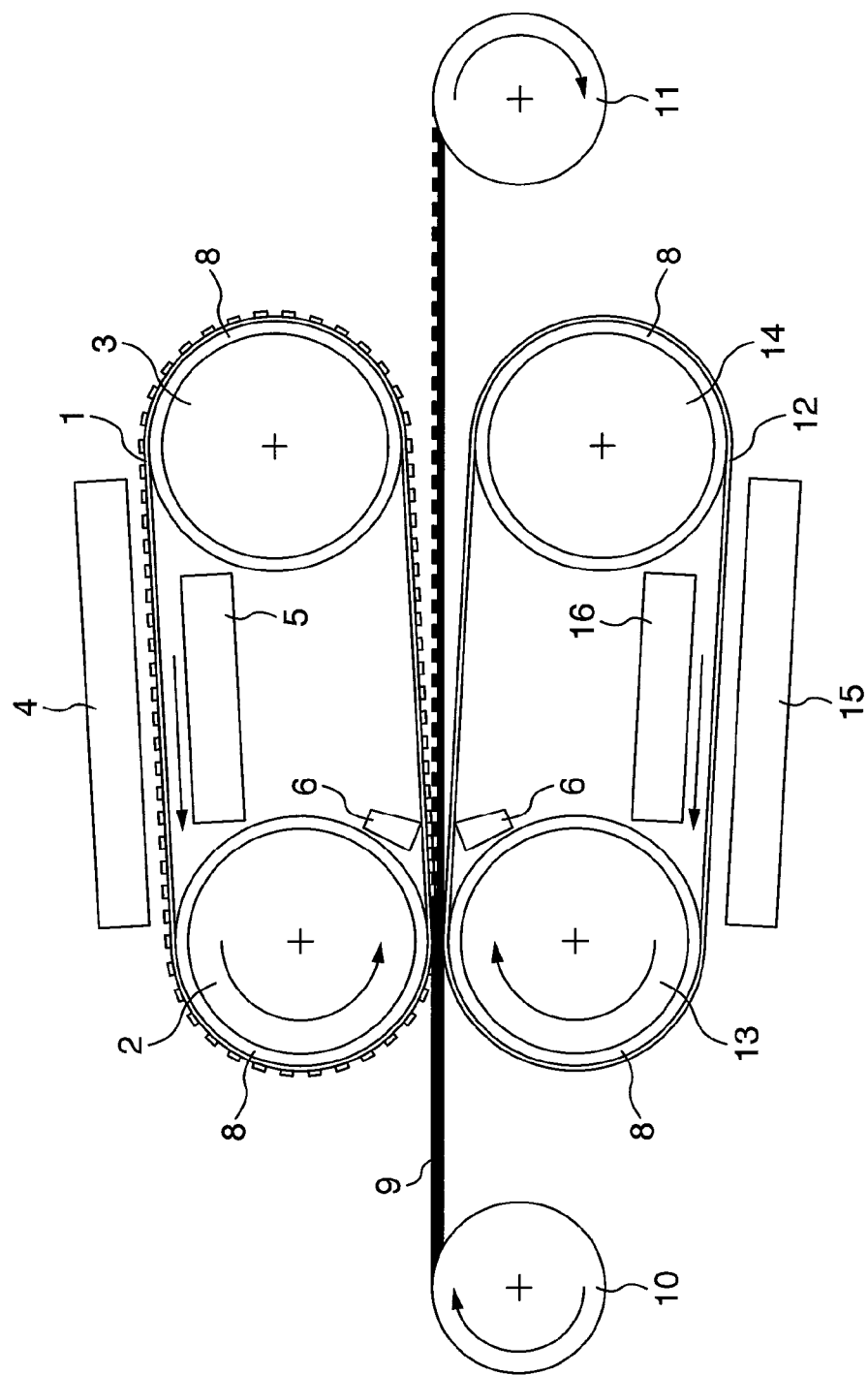
FIG. 6 is a schematic diagram of a peeling operation to peel the belt-like mold and the supporting base material from the transferred object in the fine structure formation apparatus without having the cooling rollers.

The cooling mechanism is a mechanism used for cooling down the belt-like mold 1, the transferred object 9 and the supporting base material 12, integrated by the cylindrical shape pressurizing mechanism. In the cooling mechanism according to this embodiment, a gas or cooling medium is blown to the integrated belt-like mold 1, the transferred object 9 and the supporting base material 12 to be cooled down to a temperature equal to or lower than the glass transition temperature of the transferred object 9. Here, it is desirable that cooling rollers in which the cooling mechanism is built-in are disposed on right after the cylindrical shape rollers so that the belt-lie mold 1, the transferred object 9 and the supporting base material 12 keep contacting with each other while the transferred object 9 is being cooled down to the temperature equal to or lower than the glass transition temperature. As is illustrated in FIG. 5 and FIG. 6, even a fine structure formation apparatus without the cooling roller mechanism can perform the transfer operation.

Figure 4A:
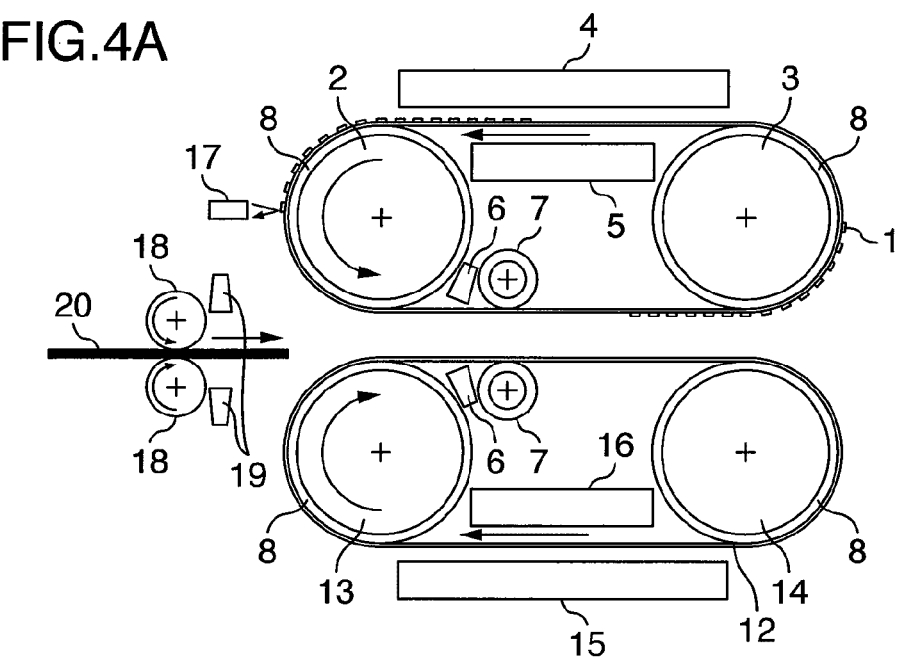
FIGS. 4A to 4C are schematic diagrams representing a process of the fine structure formation apparatus to transfer a fine structure to the transferred object.
Figure 4B:
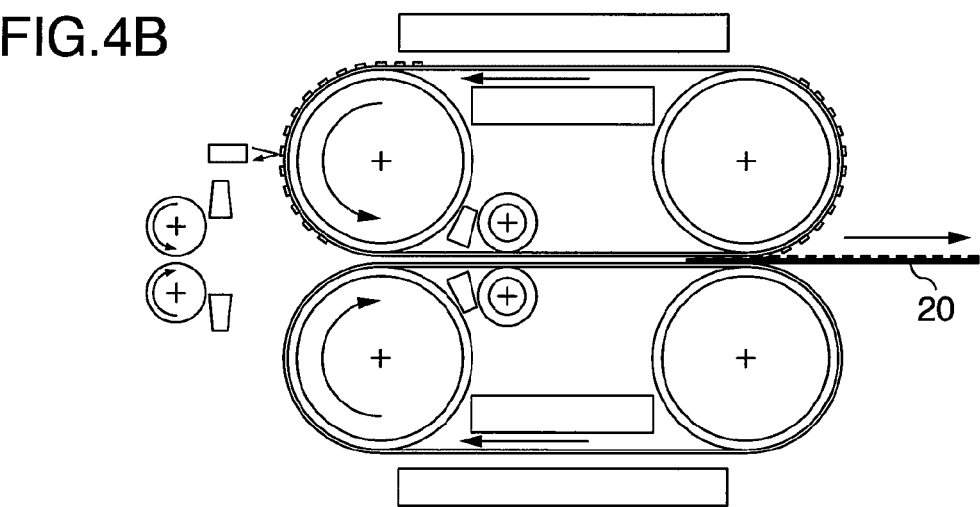
Figure 4C:
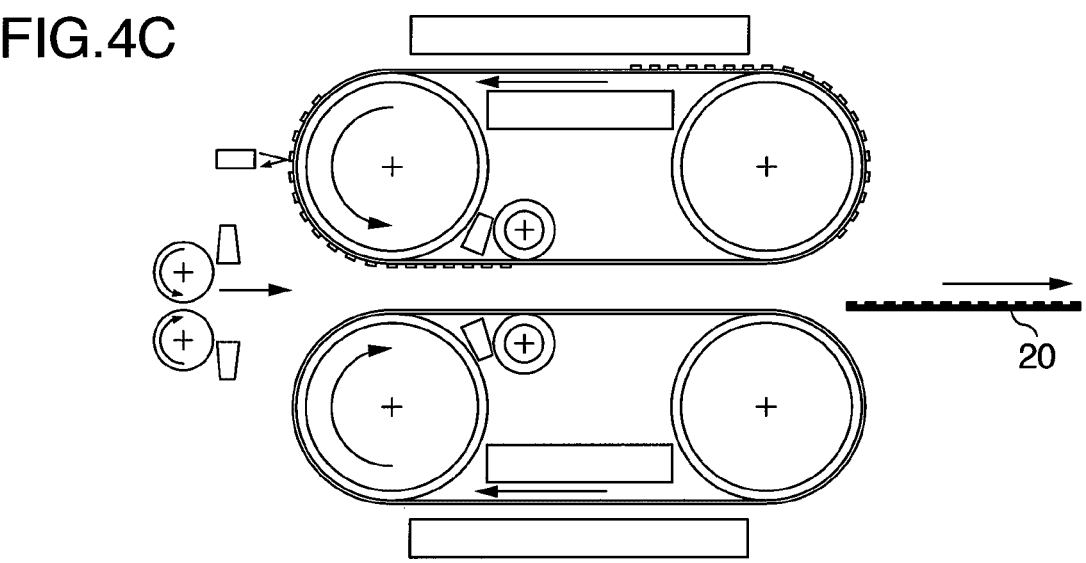

FIGS. 4A to 4C illustrate a configuration in which fine structure portions on the belt-like mold 1 are disposed with predetermined intervals, and a transferred object 20 is not of a continuous sheet-like material but a short-length one. FIG. 4A illustrates a situation before the short-length transferred object 20 enters the fine structure formation apparatus by feed rollers 18. FIG. 4B illustrates a situation in which the fine structure is transferred to the short-length transferred object 20 by the fine structure formation apparatus. FIG. 4C illustrates a situation in which the short-length transferred object 20 is ejected from the fine structure formation apparatus.

Also in the case of the above-mentioned short-length transferred object 20, it is desirable that a sensor 17 for detecting the fine structure detects the belt-like mold 1, match the speed of the transferred object 9 with the speed of the belt-like mold 1 by a material wind-off mechanism and is to be fitted into the fine structure, that is, it is desirable to perform a synchronizing operation. Further, it is possible to feed manually the short-length transferred object 20 into the fine structure formation apparatus. When a relatively thick transferred object is entered into the cylindrical shape pressurizing mechanism under a pressurized condition, the elastic body 8 formed on the cylindrical shape pressurizing mechanism rollers might suffer a damage, therefore, it is desirable to use the sensor 17 for detecting the belt-like mold 1.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A fine structure formation apparatus for forming a fine structure on a surface of a transferred object by using a belt mold, comprising:
   a cylindrical shape pressurizing mechanism having a pair of cylindrical shape rollers opposed with each other to heat and pressurize the belt mold;
   a supporting base material travelling on the cylindrical shape rollers on a side of the transferred object;
   a preheating mechanism which heats up the belt mold right before the belt mold is contacted to the cylindrical shape rollers;
   a contacting mechanism to contact the belt mold, the transferred object and the supporting base material;
   a cooling mechanism which cools down the belt mold under a predetermined pressure forcibly maintained, right after the belt mold is heated and pressurized by the cylindrical shape rollers; and
   an elastic body is formed on a surface of each of the pair of cylindrical shape rollers of the cylindrical shape pressurizing mechanism, wherein:
   the belt mold, the transferred object and the supporting base material travel under a non-contact condition to the cylindrical shape pressurizing mechanism, and pressurized by the cylindrical shape pressurizing mechanism under a condition that the transferred object is sandwiched between the belt mold and the supporting base material; and
   wherein the elastic body has a heat resistance in a range from 200° C. to 300° C. and a coefficient of elasticity ranging from about 100 MPa to 4000 MPa.

2. The apparatus according to claim 1, wherein the belt mold has a mold structure on an entire circumference or on a part of the belt mold.

3. The apparatus according to claim 1, wherein the supporting base material is a belt shape.

4. The apparatus according to claim 1, wherein a material of the supporting base material is the same as that of the belt mold.

5. The apparatus according to claim 1, wherein the supporting base material is made of a metal.

6. The apparatus according to claim 1, wherein the supporting base material is made of a material having flexibility.

7. The apparatus according to claim 1, wherein the transferred object is a belt film having a thickness equal to or less than 100 μm.

8. The apparatus according to claim 1, further comprising a peeling mechanism which peels the belt mold and the supporting base material from the transferred object, wherein the belt mold, the transferred object and supporting base material travel being contacted to each other from the cylindrical shape pressurizing mechanism to the peeling mechanism.

9. The apparatus according to claim 1, wherein the preheating mechanism comprises using a radiation heat to heat up rapidly.

10. The apparatus according to claim 1, wherein the preheating mechanism comprises using a high-frequency induction heating under a non-contact condition to heat up rapidly.

11. The apparatus according to claim 1, wherein the preheating mechanism comprises a heating roller contacted to a rear surface of the belt mold to heat up rapidly.

12. The apparatus according to claim 1, wherein the preheating mechanism monitors a temperature of the belt mold to control a power to the preheating mechanism.

13. The apparatus according to claim 1, wherein the preheating mechanism controls a power thereto from a circumferential speed of the belt mold.

14. The apparatus according to claim 1, further comprising a transferred object supplying mechanism to supply the transferred object to the cylindrical shape pressurizing mechanism.

15. The apparatus according to claim 1, further comprising a mechanism which calibrates automatically or semi-automatically displacement of the belt mold from a predetermined position on the pair of cylindrical shape rollers.

16. The apparatus according to claim 1, further comprising a wind-off roller cooperated with the cylindrical shape rollers to automatically wind off the transferred object.

17. The apparatus according to claim 1, further comprising a roll-up roller cooperated with the cylindrical shape rollers to automatically roll up the transferred object.

18. The apparatus according to claim 16, further comprising a mechanism having a sensor which detects a mold on the belt mold and the transferred object to detect that the belt mold and the transferred object arrived at a predetermined position, and the mechanism capable of following the operation of the mold and automatically winding off the transferred object.

19. The apparatus according to claim 18, wherein the transferred object comprises a plurality of short-length pieces which are transferred one by one and continuously.

* * * * *